US011604581B1

(12) United States Patent
Edwards et al.

(10) Patent No.: US 11,604,581 B1
(45) Date of Patent: Mar. 14, 2023

(54) AUGMENTED REALITY (AR) PLATFORM

(71) Applicant: DIGITAL TONIC, LLC, Lewisville, TX (US)

(72) Inventors: Joe R. Edwards, Flower Mound, TX (US); Preston R. McCauley, Dallas, TX (US)

(73) Assignee: DIGITAL TONIC, LLC, Lewisville, TX (US)

( * ) Notice: Subject to any disclaimer, the term of this patent is extended or adjusted under 35 U.S.C. 154(b) by 0 days.

(21) Appl. No.: 17/705,264

(22) Filed: Mar. 25, 2022

(51) Int. Cl.
*G06F 3/04886* (2022.01)
*G06T 19/00* (2011.01)
*G06F 3/04815* (2022.01)
*G06V 20/20* (2022.01)
*H04W 4/021* (2018.01)
*G06V 10/22* (2022.01)

(52) U.S. Cl.
CPC ...... *G06F 3/04886* (2013.01); *G06F 3/04815* (2013.01); *G06T 19/006* (2013.01); *G06V 10/225* (2022.01); *G06V 20/20* (2022.01); *H04W 4/021* (2013.01)

(58) Field of Classification Search
None
See application file for complete search history.

(56) References Cited

U.S. PATENT DOCUMENTS

| 2019/0018656 | A1* | 1/2019 | Monsarrat | G06T 19/006 |
| 2019/0392640 | A1* | 12/2019 | Qian | G06F 3/011 |
| 2022/0076851 | A1* | 3/2022 | Kamangar | G06Q 30/0633 |

* cited by examiner

*Primary Examiner* — Christopher J Kohlman
(74) *Attorney, Agent, or Firm* — Polsinelli PC

(57) ABSTRACT

The present disclosure generally relates to techniques for managing augmented reality. Some aspects of the present disclosure include systems and techniques for facilitating setup and creation of augmented reality experiences. One example method generally includes receiving, at a computing device, an indication of a sensor input trigger via an administrative user platform, receiving, at the computing device and via the administrative user platform, a mapping of the sensor input trigger to an AR experience to be displayed at one or more user devices upon detection of the sensor input trigger, and sending, to another computing device, an indication of the sensor input trigger and the mapping of the sensor input trigger to the AR experience.

20 Claims, 15 Drawing Sheets

▽ GUIDED TOUR
⇒ GT9
⇒▽ GT10
　TOUR ID　　　　　　　　　　　　GT10
　TOUR TITLE　　　　　　　　　　 OLD TOWN HISTORY TOUR
　TOUR LOGO IMAGE　　　　　　　 ⊙ OLDTOWN_HISTORY_TOUR
　TOUR CATEGORY　　　　　　　　 HISTORY
　DIGITAL PATH BREAD CRUMBS　　⊙ BREADCRUMBMARKER
　BREAD CRUMBS IN METER　　　　 20
　TOUR DESCRIPTION　　　　　　　DISCOVER THE FUN HISTORY OF OLD TOWN THROUGH THE POWER OF AUGMENTED REALITY.
▽ GUIDED TOUR PATHPOINTS　　　　 4
⇒▽ G10P1
　TOUR PATH POINT ID　　　　　　G10P1
　NAME　　　　　　　　　　　　　 WAYNE FERGUSON SCULPTURE
　DESCRIPTION　　　　　　　　　 OFFERING A PLACE FOR FAMILY ENTERTAINMENT, ACCESS TO DINING AND SHOPPING AND
　LATITUDE　　　　　　　　　　　33.046854
　LONGITUDE　　　　　　　　　　 -96.996460
　HEIGHT FROM GROUND　　　　　　0
　TOUR POINT CAROUSEL THUMB　　⊙ WAYNEFERGUSON
　AUDIO ACTIVATED SOUND CLIP　 ♪ AUDIO-ARRIVED_02
　AUTO PLACEMENT　　　　　　　　☐
　EXPERIENCE DESTINATION PREFAB ⊙ EXPGROUPALLIGATORSWARM
　COLLECTIBLE ITEM　　　　　　　⊙ TROPHY
　PATH TITLE　　　　　　　　　　WAYNE FERGUSON SCULPTURE
　RADIUS IN METERS　　　　　　　2
　UI DESCRIPTION　　　　　　　　EARLY IN HIS CAREER AS A LAND DEVELOPER, WAYNE HAD TO CHASE TRESPASSING ALLIG
⇒▽ G10P2

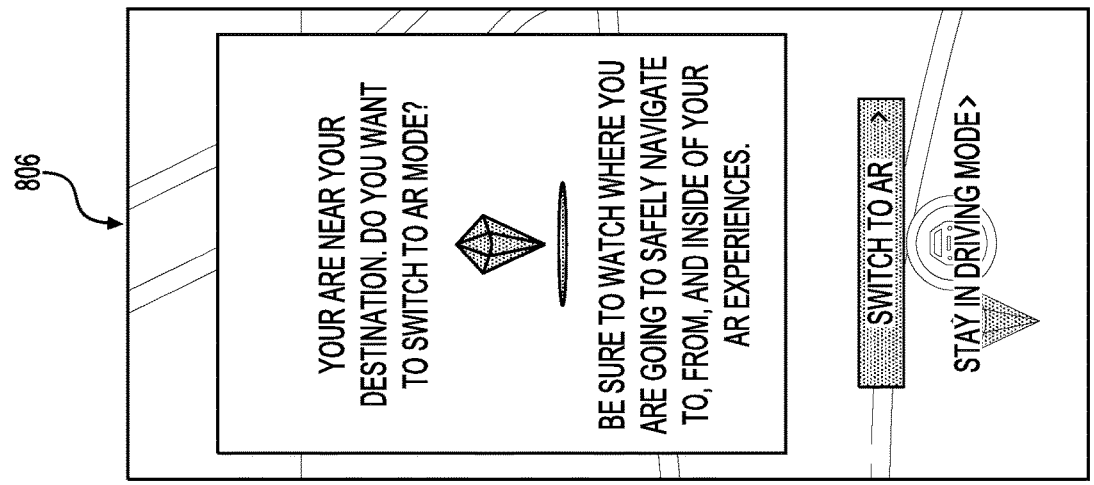
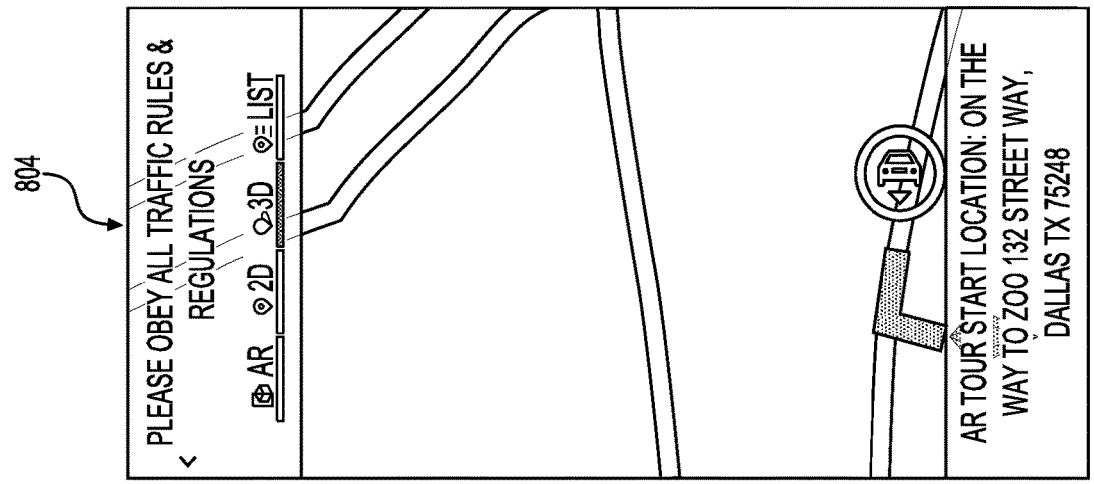
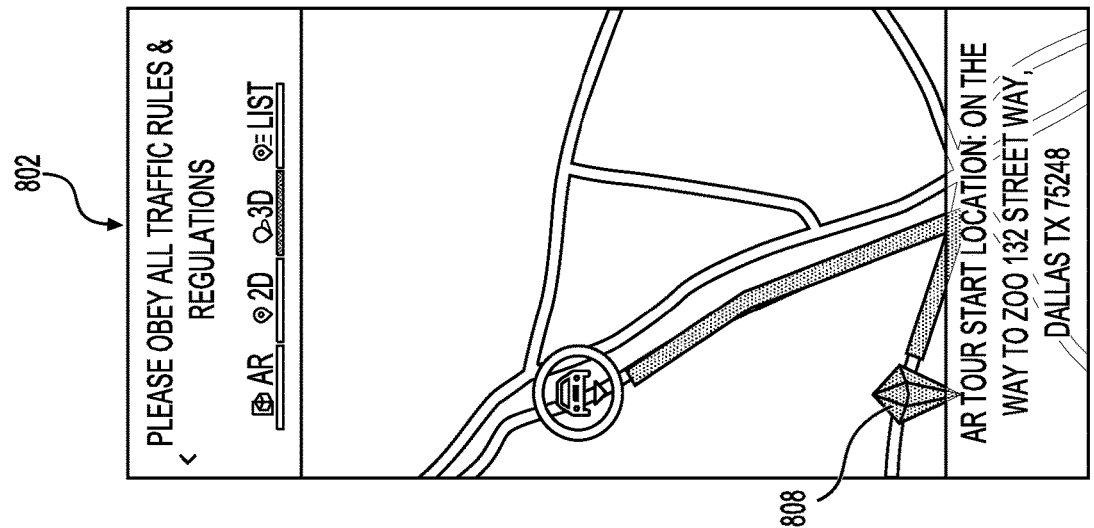
FIG. 8

AUGMENTED REALITY (AR) PLATFORM

FIELD

The present disclosure generally relates to techniques for managing augmented reality. Some aspects of the present disclosure include systems and techniques for facilitating setup and creation of augmented reality experiences.

BACKGROUND

Augmented Reality (AR) includes techniques for showing virtual objects superimposed over an image or video of a real environment. For example, an image of a street that includes a restaurant may be augmented by adding the name of the restaurant superimposed over the image of the restaurant. The image may be a sequence of images forming a video. Computing devices may be deployed to allow a camera to be pointed at a location to see the location on a display of the camera. The computing device may also obtain data about the location being captured by the camera, as well as of orientation and location information about the computing device. Based on this information, augment reality content is shown on the display of the computing device. AR techniques may also be used to mix real world video with three-dimensional graphics.

SUMMARY

Certain aspects of the present disclosure are directed to a method for augmented reality (AR) processing. The method generally includes receiving, at a computing device, an indication of a sensor input trigger via an administrative user platform, receiving, at the computing device and via the administrative user platform, a mapping of the sensor input trigger to an AR experience to be displayed at one or more user devices upon detection of the sensor input trigger, and sending, to another computing device, an indication of the sensor input trigger and the mapping of the sensor input trigger to the AR experience.

Certain aspects of the present disclosure are directed to a method for AR processing. The method generally includes detecting a sensor input trigger via at least one sensor of the user device, selecting an AR experience mapped to the sensor input trigger, displaying the AR experience to a user of the user device in response to the sensor input trigger being detected, and providing a marker to be scanned by another user device to coordinate the AR experience between the user device and another user device.

Certain aspects of the present disclosure are directed to a method for AR processing. The method generally includes scanning a marker provided by another user device via at least one sensor of the user device, selecting an AR experience based on the marker, displaying the AR experience to a user of the user device in response to scanning the marker, and receiving data coordinating the AR experience between the user device and the other user device.

Certain aspects of the present disclosure are directed to a method for AR processing. The method generally includes receiving, at a computing device and via an AR input platform, an indication of an AR experience, verifying, at the computing device, whether the AR experience meets at least one criteria, and providing an indication of the AR experience to be stored if the AR experience meets the at least one criteria.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 4 illustrates an example administrative user platform, in accordance with certain aspects of the present disclosure.

FIG. 8 illustrates techniques for providing driving directions to an AR tour using a global positioning system (GPS), in accordance with certain aspects of the present disclosure.

DETAILED DESCRIPTION

Figure 1:
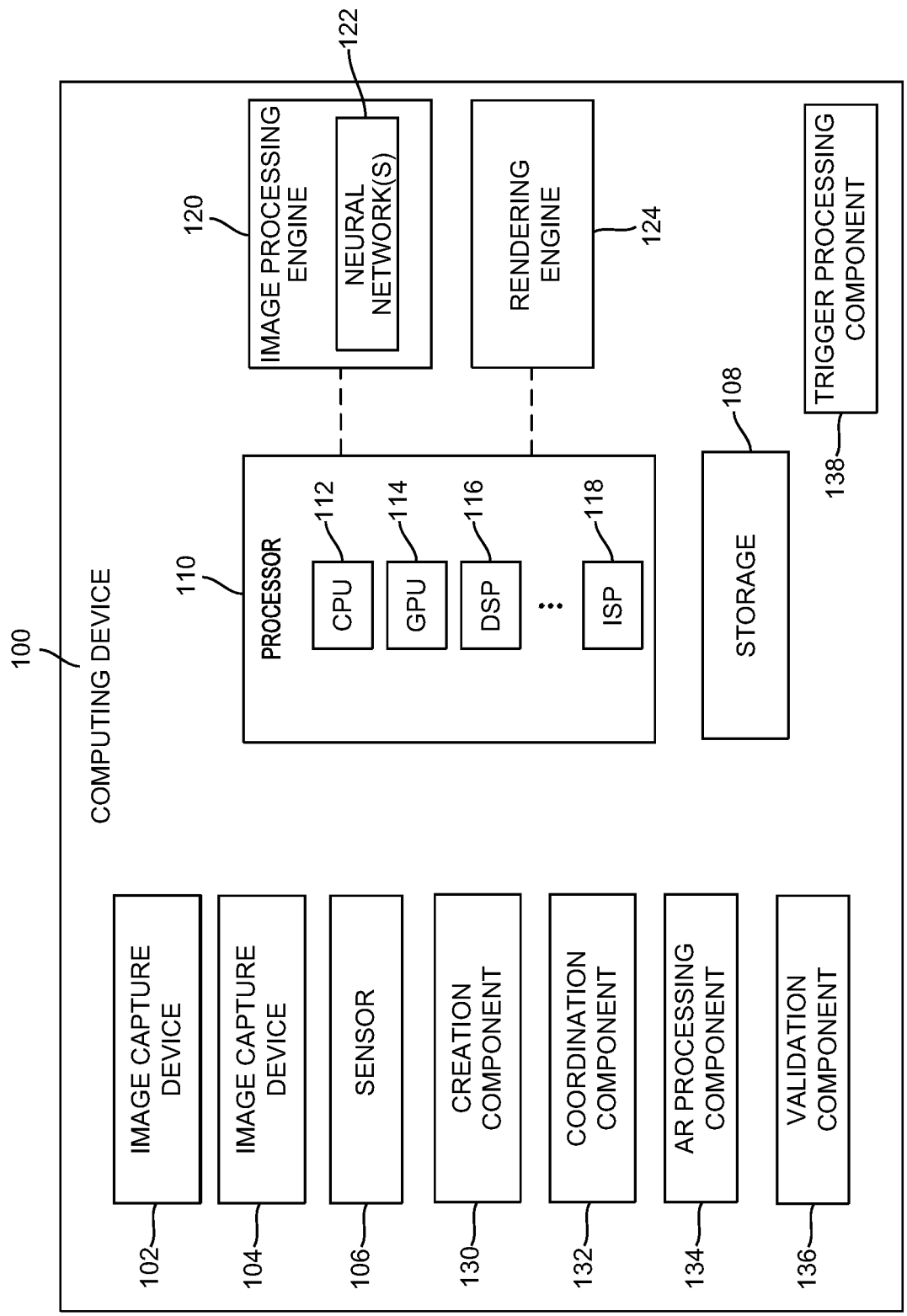
FIG. 1 is a diagram illustrating an example computing device, in accordance with certain aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Certain aspects of the present disclosure are directed to systems and techniques for managing augmented reality (AR) experiences. For example, some aspects provide an administrative user platform (e.g., a content creation portal) that allow an administrator to setup an AR experience and map the AR experience to a specific sensor input trigger that initiates the AR experience. The sensor input trigger may be a particular marker that a user could scan to begin the AR experience set up by the administrator, or the sensor input trigger may be geolocation-based (e.g., specific geolocation at which the AR experience may initiate). As used herein, an administrator generally refers to any individual that uses the administrative user platform to set up an AR experience. The administrative user platform may provide various preset fields for selecting one of multiple candidate AR experiences, a sensor input trigger, as well other configurations associated with the AR experience, as described in more detail herein.

Certain aspects facilitate the classification of AR experiences into tour groups. For instance, via the administrative user platform, an administrative user may select various tour points that a user may follow until they reach one or more locations where one or more AR experiences may be triggered. Each tour group provides a combination of latitude and longitude sequences that contain information to display a geo-triggered event (e.g., an AR experience).

In some aspects, an AR creation platform may be used to facilitate the inflow of AR content from creators. For example, the AR creation platform may receive AR content from users and use a validation mechanism to verify that the AR content meets various criteria before uploading the AR content to be included in a catalog of AR experiences. The AR creation platform validates the upload of content by, for example, scanning 3D models for polys, tries, or other criteria. The AR creation platform may be integrated as part of the administrative user platform or a separate platform (e.g., portal).

Once AR experiences are created using the administrative user platform, users can trigger such experiences using an AR application. For example, a user may scan a visual marker with their phone, serving as a sensor input trigger mapped to an AR experience which may be initiated for the user. Once an AR experience is triggered, the user may provide a marker scanned by at least one other user to join the AR experience. For example, the user's application may be used to display a marker on the user's mobile device, which the other user may scan to join the AR experience. In this manner, a multi-user AR experience may be implemented, such as an AR gaming experience.

FIG. 1 is a diagram illustrating an example computing device 100, in accordance with certain aspects of the present disclosure. In the example shown, the computing device 100 includes a image capture device 102 (e.g., camera), storage 108, processor 110, an image processing engine 120, one or more neural network(s) 122, and a rendering engine 124. The computing device 100 can also optionally include one or more additional image capture devices 104; one or more sensors 106, such as light detection and ranging (LIDAR) sensor, a radio detection and ranging (RADAR) sensor, an accelerometer, a gyroscope, a light sensor, an inertial measurement unit (IMU), a proximity sensor, or a global positioning system (GPS). In some cases, the computing device 100 can include image capture devices capable of capturing images with different fields of view (FOVs) or facing different directions. For example, in dual camera or image sensor applications, the computing device 100 can include image capture devices with different types of lenses (e.g., wide angle, telephoto, standard, zoom, etc.) capable of capturing images with different FOVs (e.g., different angles of view, different depths of field, etc.).

The computing device 100 may be any electronic device such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a television, a display device, a digital media player, a game console, a video streaming device, a drone, a computer in a car, an IoT (Internet-of-Things) device, a smart wearable device, an extended reality (XR) device (e.g., a head-mounted display, smart glasses, etc.), or any other suitable electronic device for managing or experiences augmented reality.

In some examples, the image capture devices 102 and 104 can be any image and/or video capture devices, such as a digital camera, a video camera, a smartphone camera, a camera device on an electronic apparatus such as a television or computer, a camera system, etc. In some cases, the image capture devices 102 and 104 can be part of a camera or computing device such as a digital camera, a video camera, an IP camera, a smartphone, a smart television, a game system, etc. In some examples, the image capture device 102 and 104 can be part of a dual-camera assembly. The image capture devices 102 and 104 can capture image and/or video content (e.g., raw image and/or video data), which can then be processed by the processor 110, the image processing engine 120, the neural network(s) 122, and/or the rendering engine 124 as described herein.

In some cases, the image capture devices 102 and 104 can include image sensors and/or lenses for capturing image data (e.g., still pictures, video frames, etc.). The image capture devices 102 and 104 can capture image data with different or same FOVs, including different or same angles of view, different or same depths of field, different or same sizes, etc. For example, in some cases, the image capture devices 102 and 104 can include different image sensors having different FOVs. In other examples, the image capture devices 102 and 104 can include different types of lenses with different FOVs, such as wide angle lenses, telephoto lenses (e.g., short telephoto, medium telephoto), standard lenses, zoom lenses, etc. In some examples, the image capture device 102 can include one type of lens and the image capture device 104 can include a different type of lens. In some cases, the image capture devices 102 and 104 can be responsive to different types of light. For example, in some cases, the image capture device 102 can be responsive to visible light and the image capture device 104 can be responsive to infrared light.

The other sensor(s) 106 can be any sensor for detecting and measuring information such as distance, motion, position, depth, speed, etc. Non-limiting examples of sensors include LIDARs, ultrasonic sensors, gyroscopes, accelerometers, magnetometers, RADARs, IMUs, audio sensors, and/or light sensors. In one illustrative example, the sensor 106 can be a LIDAR configured to sense or measure distance and/or depth information. In some cases, the computing device 100 can include other sensors, such as a machine vision sensor, a smart scene sensor, a speech recognition sensor, an impact sensor, a position sensor, a tilt sensor, a light sensor, etc.

The storage 108 can include any storage device(s) for storing data, such as image data for example. The storage 108 can store data from any of the components of the computing device 100. For example, the storage 108 can store data or measurements from any of the image capture devices 102 and 104, the other sensor(s) 106, the processor 110, and/or any of the image processing engine 120, the neural network(s) 122, and/or the rendering engine 124 (e.g., output images, processing results, parameters, etc.).

In some implementations, the processor 110 can include a central processing unit (CPU) 112, a graphics processing unit (GPU) 114, a digital signal processor (DSP) 116, and/or an image signal processor (ISP) 118. The processor 110 can perform various operations such as image enhancement, feature extraction, depth estimation, computer vision, graphics rendering, XR (e.g., augmented reality, virtual reality, mixed reality, and the like), image/video processing, sensor processing, recognition (e.g., text recognition, object recognition, feature recognition, facial recognition, pattern recognition, scene recognition, etc.), foreground prediction, machine learning, filtering, depth-of-field effect calculations or renderings, tracking, localization, and/or any of the various operations described herein. In some examples, the processor 110 can implement the image processing engine 120, the neural network(s) 122, and the rendering engine 124. In other examples, the processor 110 can also implement one or more other processing engines.

The operations of the image processing engine 120, the neural network(s) 122, and the rendering engine 124 can be implemented by one or more components of the processor 110. In one illustrative example, the image processing engine 120 and the neural network(s) 122 (and associated operations) can be implemented by the CPU 112, the DSP 116, and/or the ISP 118, and the rendering engine 124 (and associated operations) can be implemented by the GPU 114. In some cases, the processor 110 can include other electronic circuits or hardware, computer software, firmware, or any combination thereof, to perform any of the various operations described herein. For example, computing device 100 may include creation component 130, coordination component 132, AR processing component 134, 136//, and 138//, which may be implemented as part of processor 110 or as separate components.

While the computing device 100 is shown to include certain components, one of ordinary skill will appreciate that the computing device 100 can include more or fewer components than those shown in FIG. 1. For example, the computing device 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. In some aspects, the computing device 100 may be used to manage AR experiences.

Figure 2:
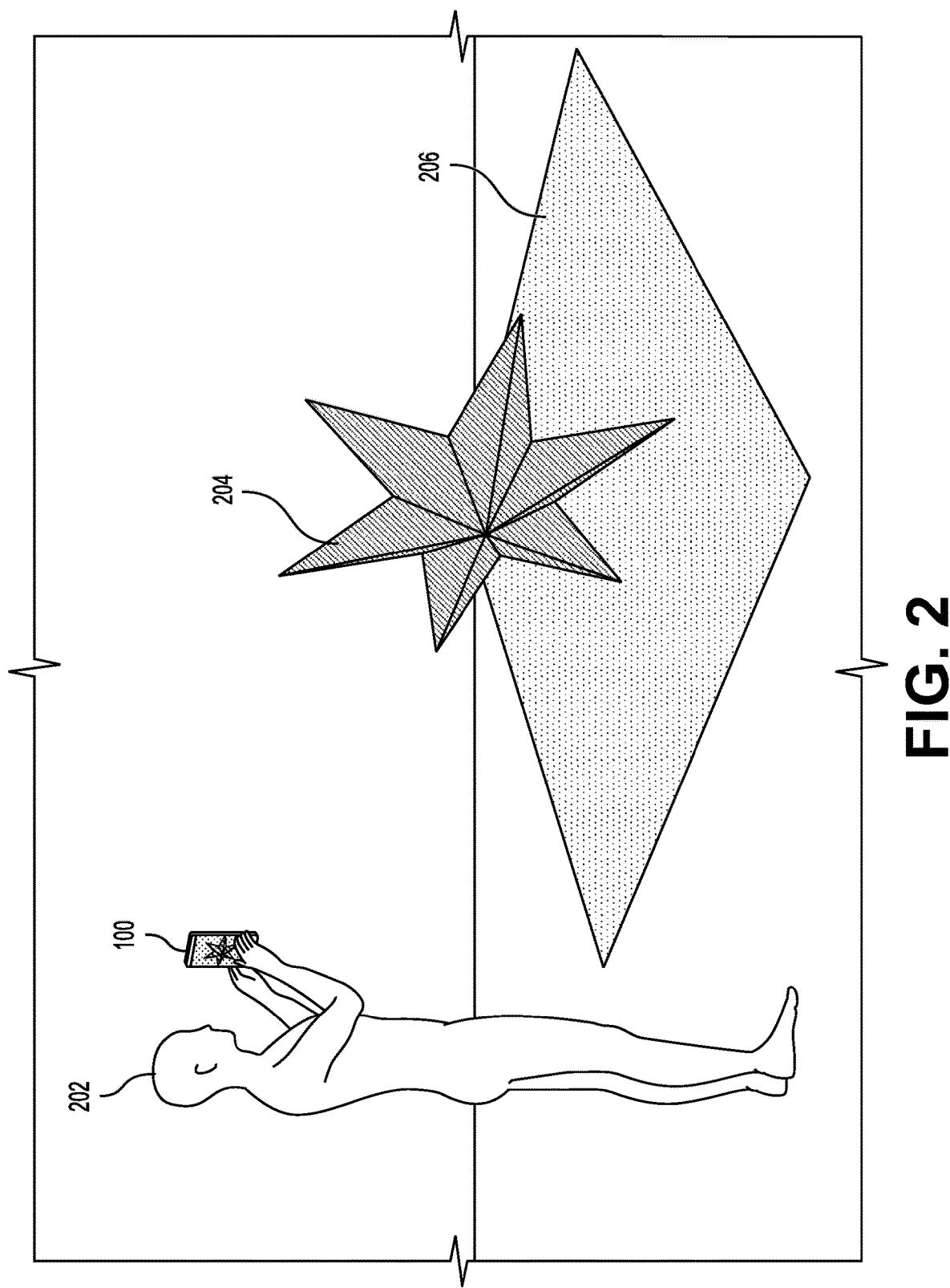
FIG. 2 illustrates a computing device scanning a plane and displaying an augmented reality (AR) experience.

FIG. 2 illustrates a computing device 100 scanning a plane 206 and displaying an AR experience. As shown, a user 202 may point a camera of the computing device 100 at an area in an environment. The display of the computing device 100 shows a digital object 204 overlaid on top of an image of the environment, as shown. The user 202 may be in an outdoor area and the digital object 204 may be shown on the scanned plane 206. Scanning the plane 206 allows the computing device 100 to detect and generate the digital object 204. While FIG. 2 shows the digital object 204 in the environment to facilitate understanding, the object 204 is overlayed on an image captured by the camera of the computing device 100 and displayed on a screen of the computing device 100.

Referring to FIG. 1, the computing device 100 may include a creation component 130, which may be used to manage an administrative user platform. The creation component 130 may display the administrative user platform to facilitate user input of AR parameters, as described herein. For instance, via the administrative user platform, the user may select an AR experience along with a sensor input trigger that initiates the AR experience. The administrative user platform may also provide the capability to setup a guided tour with tour points mapped to AR experiences, as described in more detail with respect to FIG. 3.

Figure 3:
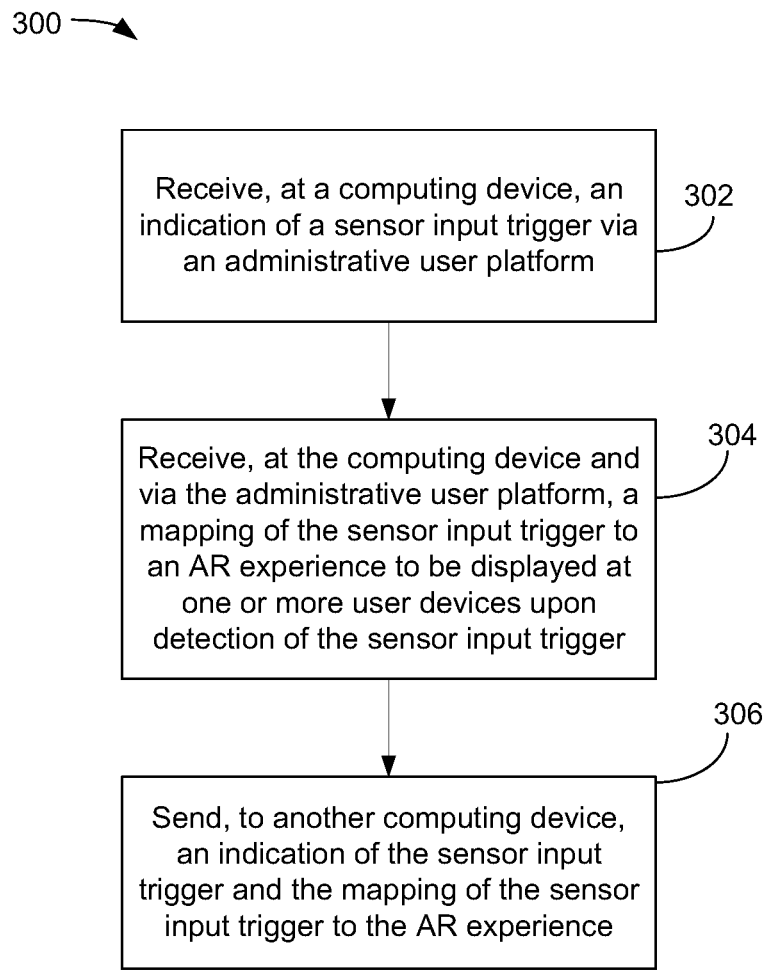
FIG. 3 is a flow diagram illustrating example operations for AR processing, in accordance with certain aspects of the present disclosure.

FIG. 3 is a flow diagram illustrating example operations 300 for AR processing, in accordance with certain aspects of the present disclosure. The operations 300 may be performed by a computing device, such as the computing device 100 including the creation component 130. For example, the operations 300 may be performed by a computing device of an administrator. As used herein, an administrator may be any person creating an AR experience using an administrative user platform.

At block 302, the computing device may receive (e.g., from an administrator) an indication of a sensor input trigger via an administrative user platform. In some aspects, the sensor input trigger may include a user device being within proximity to a real-world location. In some cases, detecting the sensor input trigger may involve scanning a marker (e.g., any visual marker such as quick response (QR) code).

At block 304, the computing device may receive, via the administrative user platform, a mapping of the sensor input trigger to an AR experience to be displayed at one or more user devices upon detection of the sensor input trigger. For example, receiving the mapping may involve receiving an indication of one of multiple candidate AR experiences configured for selection by a user via the administrative user platform.

Receiving the sensor input trigger and the mapping may include receiving an indication of the sensor input trigger and the AR experience in accordance with preset fields associated with the administrative user platform (e.g., a name associated with the AR experience, a description of the AR experience, a location for triggering the AR experience, and/or one or more configuration parameters associated with the AR experience). The preset fields are described in more detail with respect to FIG. 4.

At block 306, the computing device may send, to another computing device (e.g., a server), an indication of the sensor input trigger and the mapping of the sensor input trigger to the AR experience. In some cases, the computing device may receive an indication of tour points to be presented to a user, where the AR experience is to be triggered at one of the tour points.

FIG. 4 illustrates an example administrative user platform 400, in accordance with certain aspects of the present disclosure. As shown, administrative user platform 400 may include various preset fields for an administrative user to setup an AR experience, and in some aspects, an AR tour. For example, administrative user platform 400 may include one or more of fields including a tour identifier (ID) field, a tour title field, tour logo image field, tour category field, digital path bread crumbs field, break crumbs in meter field, and tour description field. For each of multiple tour points, various information may be included. For example, for a first tour point (labeled G10P1), administrative user platform 400 may provide one or more of fields including name of tour point, description of tour point, latitude and longitude of the tour point, height from ground (e.g., of AR experience at tour point), tour point carousel thumb, audio activated sound clip, a collectible item at the tour point, a path title, radius of the AR experience, user interface (UI) description.

Administrative user platform 400 provides the ability to add any geo decimal location or point of interest (POI) for a specific city or entity and link the information to one or more AR experiences. The AR experiences will be displayed in an application of an end user as locations on a map, allowing the end user to initiate the AR experience upon arriving at the location. In some cases, administrative user platform 400 provides the ability to bind an AR experience to a dynamic string, and generate a visual marker (e.g., a QR code) to be mapped to the AR experience. The administrator may enter any unique value into administrative user platform 400 and the platform may generate the visual marker that can then be used to link the AR experience to a geo-based or non-geo-based experience. In some aspects, multiple visual markers may be invoked either at a single time or within a multiple experience scene or environment.

In some aspects, the computing device may also receive (e.g., from the administrator) an indication of a coupon to be displayed to a user upon the AR experience being displayed. For instance, a coupon may be presented to the user to a nearby restaurant at one of the tour points. The administrative user platform 400 may be used to link a coupon to an experience aspect. As described, an AR experience may be triggered by a user at a particular location or upon scanning a visual marker. A single coupon/offer represented by a unique string can be manually set up by the administrator via administrative user platform 400 and linked to a geo-triggered experience, a dynamically generated visual marker, a geo-triggered point of interest, or a geo-triggered AR gaming sequence. Once an AR experience or tour has been implemented, one or more end users may initiate the AR experience or tour, as described in more detail with respect to FIG. 5.

Figure 5:
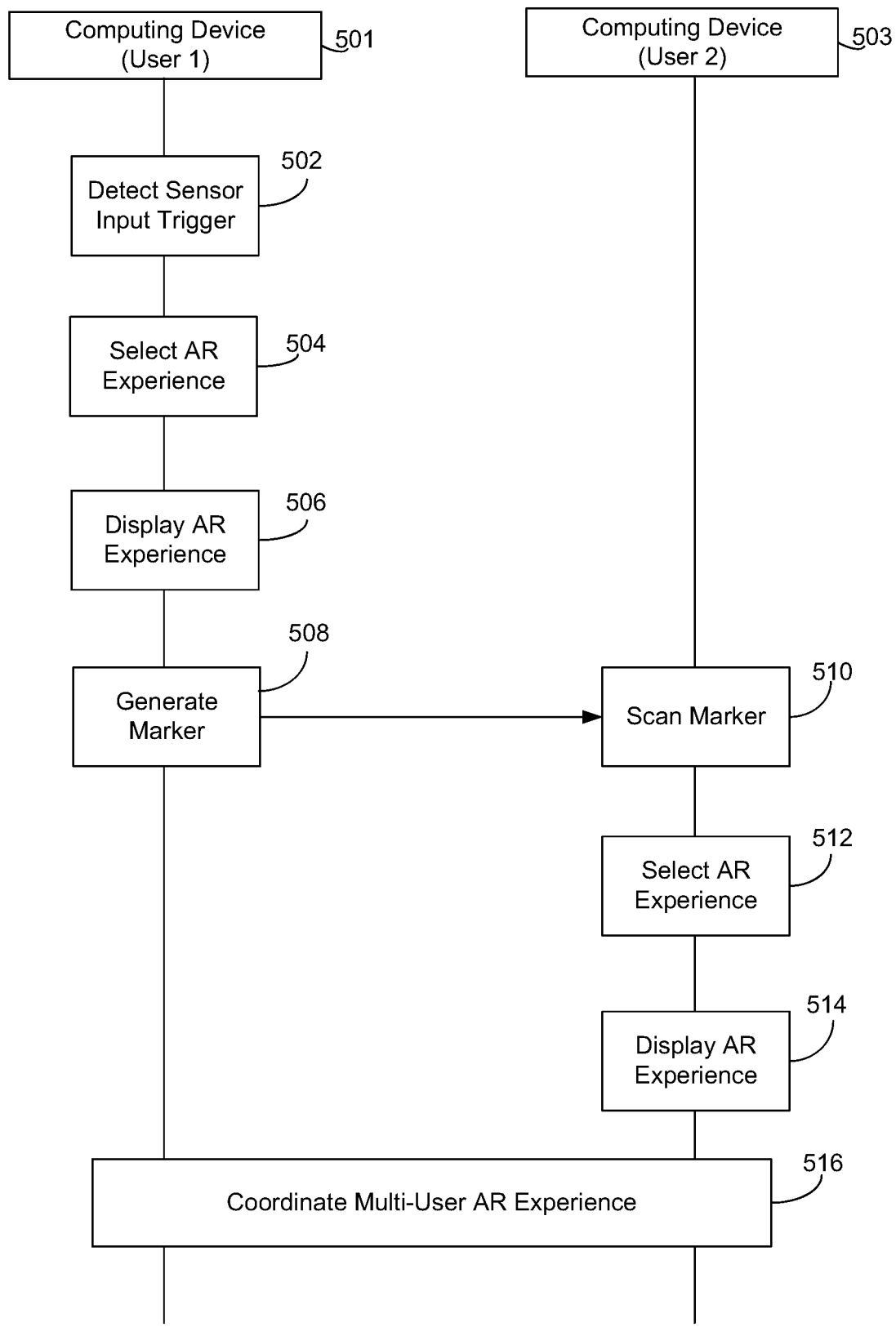
FIG. 5 illustrates coordination of an AR experience between users, in accordance with certain aspects of the present disclosure.

FIG. 5 illustrates coordination of an AR experience between users, in accordance with certain aspects of the present disclosure. As shown, at block 502, computing device 501 (also referred to herein as a user device) may detect a sensor input trigger. For instance, computing device 501 may scan a marker (e.g., any visual marker such as a QR code) or may enter a geographical area that is detected by a GPS of the computing device 501. Referring to FIG. 1, the computing device 100 may include a trigger processing component 138 for detecting the sensor input trigger.

At block 504, the computing device 501 may select an AR experience that has been mapped to the sensor input trigger. For example, as described with respect to FIG. 3, an administrator may create the AR experience and map the AR experience to the sensor input trigger. Based on the mapping, the computing device 501 selects the AR experience upon the sensor input trigger being detected. At block 506, the computing device 501 displays the AR experience.

In some aspects, the computing device 501 may generate a marker to invite another user to join in the AR experience. For example, at block 508, the computing device 501 may generate a visual marker (e.g., a QR code) that is displayed on a screen of the computing device 501. Using a camera of the computing device 503, the computing device 503 may, at block 510, scan the visual marker, and at block 512, select the AR experience mapped to the visual marker. At block 514, the computing device 503 displays the AR experience. At block 516, the computing devices 501, 503 communicating data to coordinate the AR experience in response to the marker being scanned. In other words, the AR experience may be synchronized between computing device 501 and computing device 503 using peer-to-peer communication. In this manner, if the user of computing device 501 makes a change to the AR experience (e.g., pops a bubble for an AR experience showing multiple bubbles), the same change may be displayed to the user of computing device 503. The computing device 501 and computing device 503 may each correspond to computing device 100.

Figure 6A:
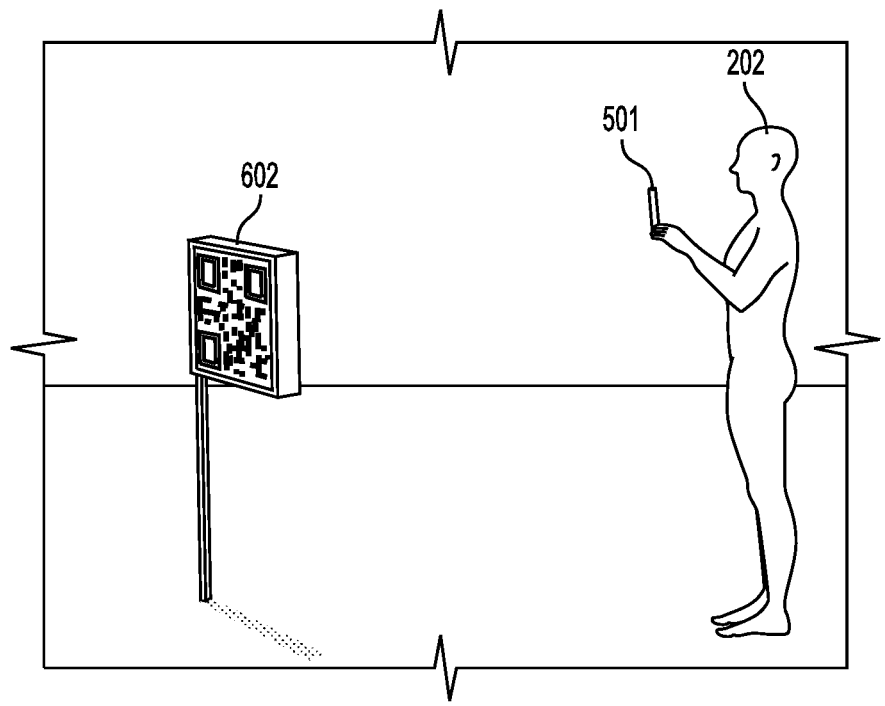
FIGS. 6A and 6B illustrate an AR experience being triggered upon detection of a visual marker, in accordance with certain aspects of the present disclosure.
Figure 6B:
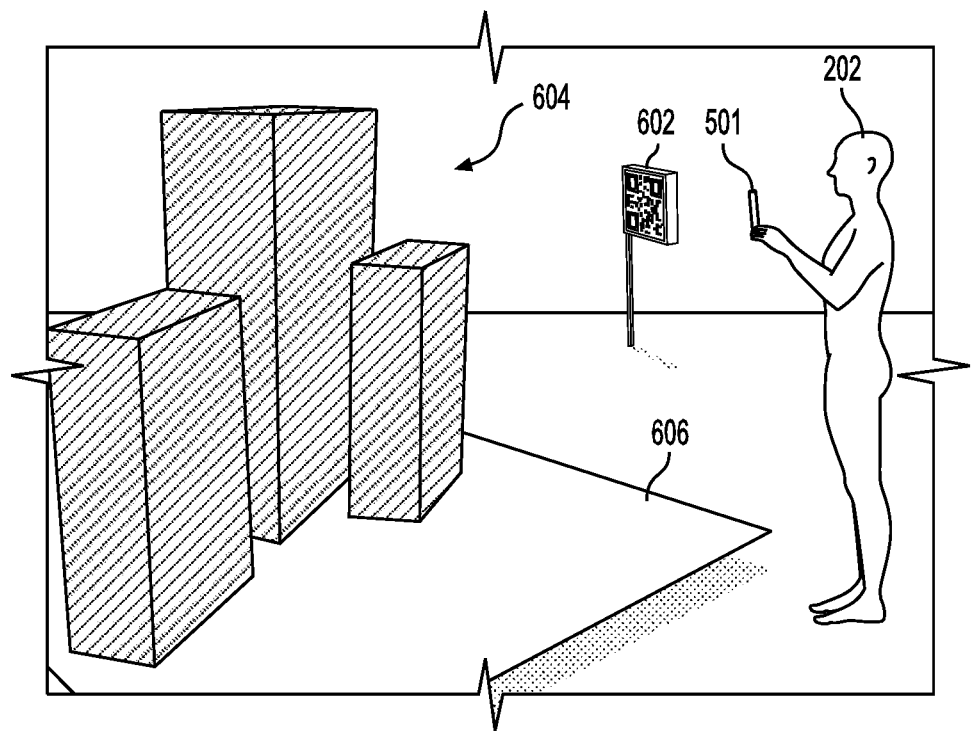

FIGS. 6A and 6B illustrate an AR experience being triggered upon detection of a visual marker, in accordance with certain aspects of the present disclosure. As shown in FIG. 6A, the user 202 may scan a visual marker 602 (e.g., a QR code). As shown in FIG. 6B, once the visual marker 602 is scanned, a plane 606 may be scanned by the user's computing device 501, and a digital object 604 may be overlayed on the plane 606, as shown by the computing device 501.

Figure 7:
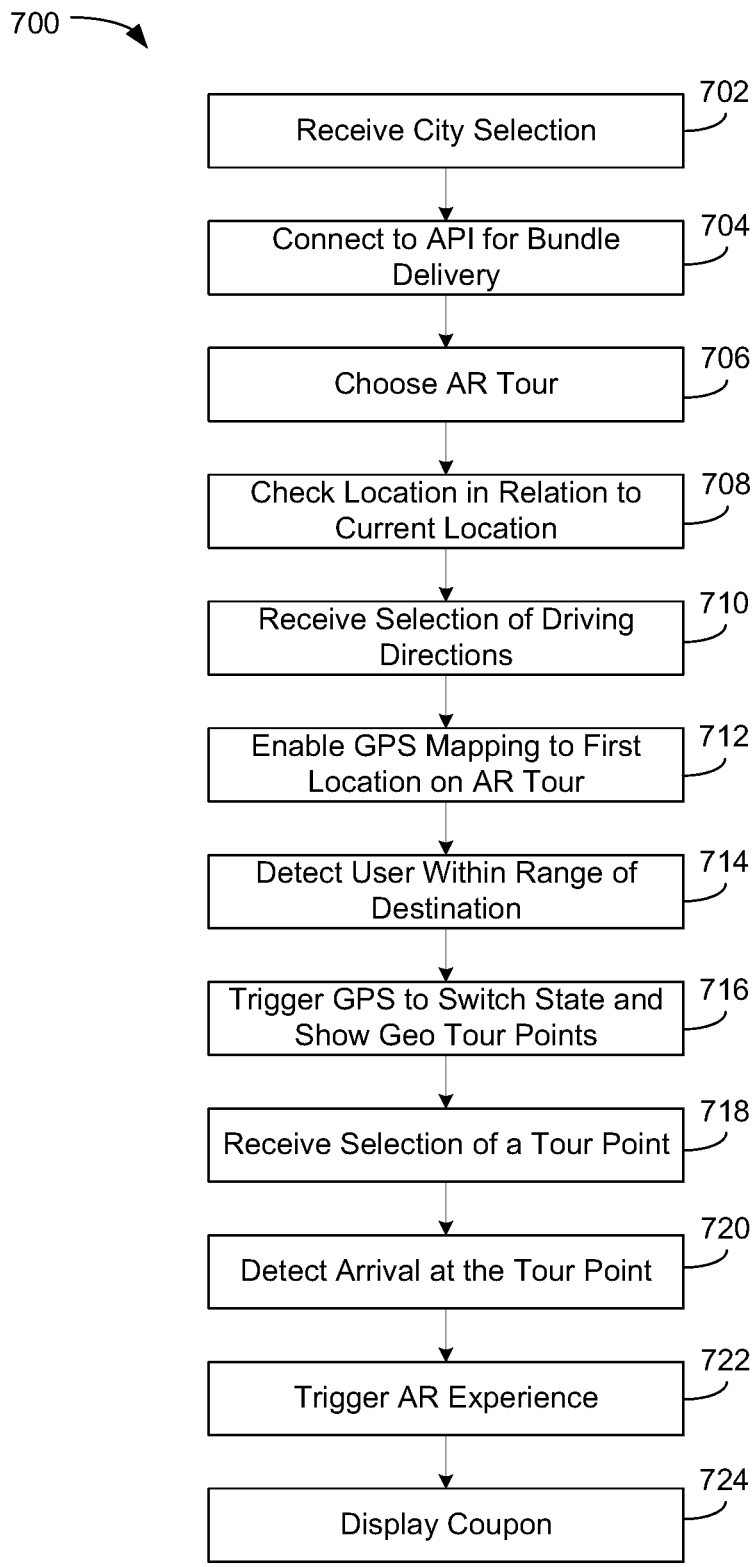
FIG. 7 is a flow diagram illustrating operations for triggering an AR experience with driving directions, in accordance with certain aspects of the present disclosure.

FIG. 7 is a flow diagram illustrating operations 700 for triggering an AR experience with driving directions, in accordance with certain aspects of the present disclosure. The operations 700 may be performed by a computing device, such as the computing device 100 or computing device 501.

At block 702, the computing device may receive a selection of a city and upon the selection, at block 704, connect to an application programming interface (API) for bundle delivery (e.g., delivery of available AR tours). At block 706, the computing device receives a selection of one of the available AR tours. At block 708, the computing device checks the location of the AR tour as compared to the current location of the computing device, and may provide an option to the use of the computing device to receive driving directions to the AR tour. At block 710, the computing device may receive a selection of the driving directions. At block 712, the computing device may enable GPS mapping to the first location on the AR tour. At block 714, the computing device may detect that the user is within a certain range to the first location on the AR tour, and in response, at block 716, trigger the GPS to switch states and show geo tour points. At block 718, the computing device may receive selection of a tour point on the AR tour and provide driving or walking directions to the tour point. At block 720, the computing device may detect arrival at the tour point, and at block 722, trigger an AR experience configured (e.g., via administrative user platform 400) for the tour point. At block 724, after triggering the AR experience, a coupon may be displayed by the computing device. The computing device may also provide directions to a subsequent tour point of the AR tour and repeat operations associated with blocks 720, 722, 724 for the subsequent tour point.

FIG. 8 illustrates techniques for providing driving directions to an AR tour using a GPS, in accordance with certain aspects of the present disclosure. As shown, at 802, a computing device may provide driving directions to a first location 808 of an AR tour. At 804, the computing device may detect that the computing device is within range of the first location 808, and at 806, indicate to the user that they are near the AR tour and provide an option to switch to an AR mode of the GPS.

The present disclosure provides a method to connect driving directions from a current location of a user to a start point of a geo-based tour. The user may use the GPS navigation capabilities of the computing device after choosing a tour group to experience. At this point, the user may use the navigation to the point that the computing device detects the user has arrived in close proximity to the AR experience. At this point, navigation may be switched to an AR tour mode by providing a notification for the user to switch modes of navigation. The navigation system may prompt the user to trigger the AR location system and switch the navigation system to the AR tour mode.

Figure 9:
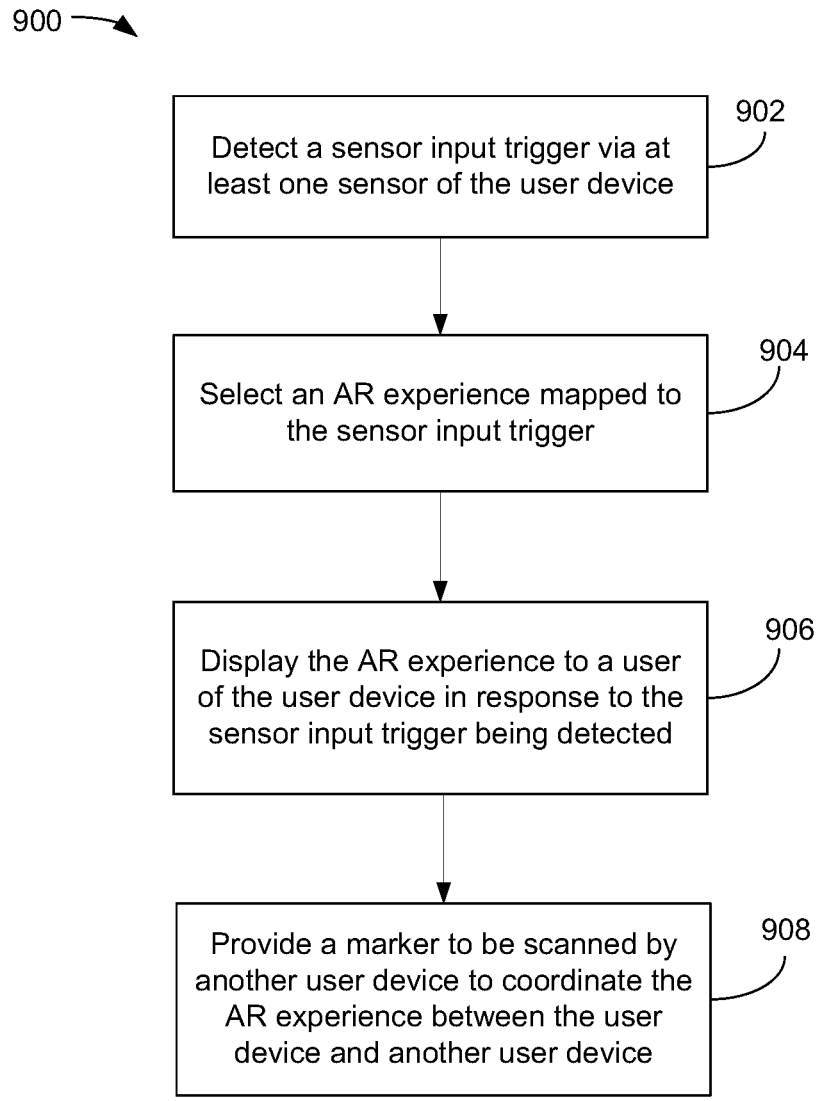
FIG. 9 is a flow diagram illustrating example operations for AR processing, in accordance with certain aspects of the present disclosure.

FIG. 9 is a flow diagram illustrating example operations 900 for AR processing, in accordance with certain aspects of the present disclosure. The operations 900 may be performed by a computing device (e.g., a user device), such as the computing device 100 or computing device 501.

At block 902, the computing device may detect a sensor input trigger via at least one sensor of the user device. Referring back to FIG. 1, the computing device 100 may include a trigger processing component 138 which may receive sensor data and/or image capture data and detect a sensor input trigger that would initiate an AR experience. Detecting the sensor input trigger may include detecting that the user is within proximity to a real-world location. Detecting the sensor input trigger may include scanning a marker (e.g., any visual marker such as a QR code).

At block 904, the computing device selects an AR experience mapped to the sensor input trigger. For example, the computing device automatically selects the AR experience that has been mapped (e.g., by an administrator) to the sensor input trigger. The AR experience may be an AR gaming experience, in some aspects. At block 906, the computing device displays the AR experience to a user of the computing device in response to the sensor input trigger being detected. For example, referring back to FIG. 1, the computing device 100 may include an AR processing component 134 which may receive sensor data (e.g., from sensor 106) and image capture data (e.g., from image capture device 102 or 104), and process an AR experience accordingly for display.

In some aspects, at block 908, the computing device may provide a marker to be scanned by another computing device (e.g., another user device) to coordinate the AR experience between the computing device and the other computing device. For example, referring back to FIG. 1, the computing device 100 may include a coordination component 132 which may be used to coordinate the AR experiences between multiple computing devices. In some aspects, the computing device may communicate data between the user device and the other user device to coordinate the AR experience in response to the marker being scanned. The data may be communicated using a peer-to-peer connection between the computing device and the other computing device. The AR experience being coordinated between the user device and the other user device may involve the AR experience being synchronized when displayed at the user device and the other user device. In some aspects, coordinating the AR experience may include synchronizing planar data (e.g., data associated with plane 206 of FIG. 2 or plane 606 of FIG. 6B) and an anchor reference point in an augmented space.

In some aspects, the computing device displays a coupon to the user in response to the AR experience being displayed. In some aspects, the computing device detects that the computing device is within proximity to a location associated with the AR experience, and in response to detecting that the user is within proximity to the location, sends a notification to the user to switch to a navigation feature that directs the user to the location associated with the AR experience. The navigation feature may use either driving or walking directions. In some aspects, the computing device may display, to a user of the computing device, tour points on a map. Detecting the sensor input trigger may include detecting that the computing device is in proximity to one of the tour points.

Figure 10:
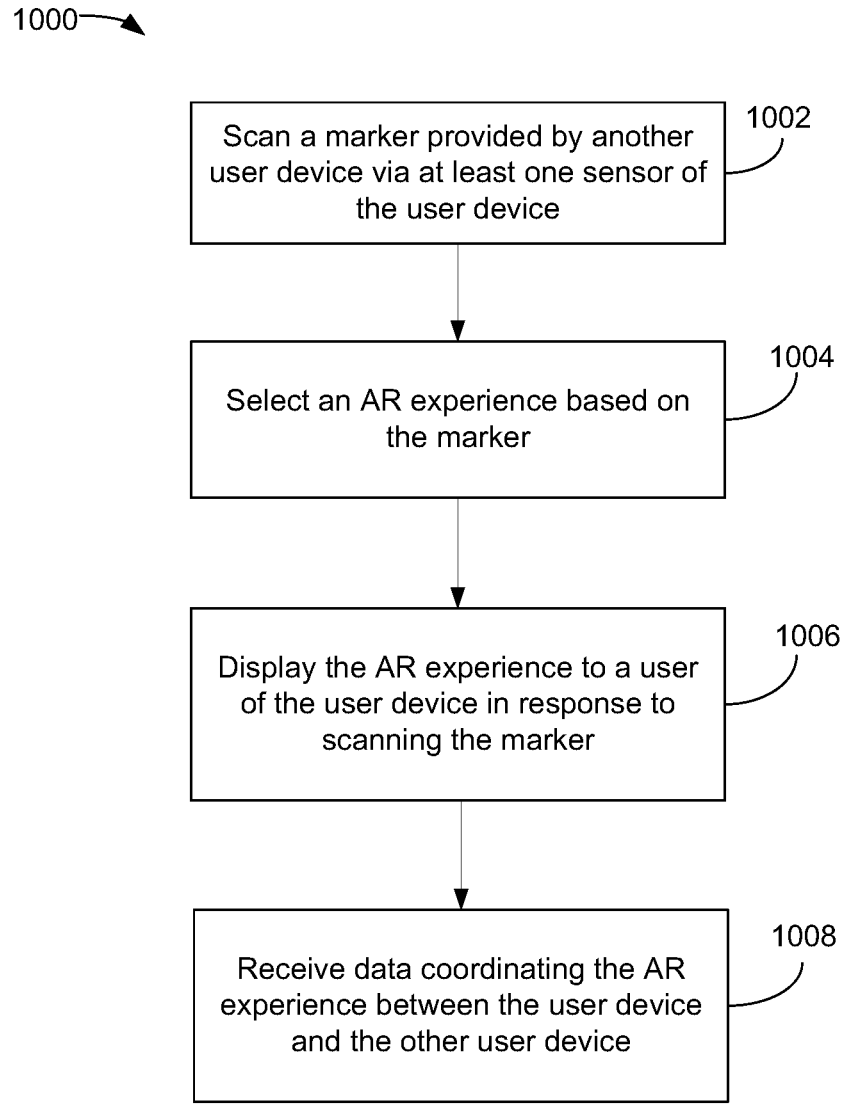
FIG. 10 is a flow diagram illustrating example operations for AR processing, in accordance with certain aspects of the present disclosure.

FIG. 10 is a flow diagram illustrating example operations 1000 for AR processing, in accordance with certain aspects of the present disclosure. The operations 1000 may be performed by a computing device (e.g., a user device), such as the computing device 100 or computing device 503. The operations 1000 may be complementary to the operations 900 described with respect to FIG. 9.

At block 1002, the computing device may scan a marker (e.g., any visual marker such as a QR code) provided by another computing device (e.g., the computing device performing operations 900) via at least one sensor of the computing device. For example, a camera of the computing device may be used to scan a QR code on a screen of the other computing device. At block 1004, the computing device may select an AR experience (e.g., an AR gaming experience) based on the marker.

At block 1006, the computing device may display the AR experience to a user of the computing device in response to scanning the marker. In some cases, the computing device may display a coupon to a user of the computing device in response to the AR experience being displayed.

At block 1008, the computing may receive data coordinating the AR experience between the user device and the other user device. As described, coordinating the AR experience may involve synchronizing planar data and an anchor reference point in an augmented space. The data may be received using a peer to peer connection between the computing device and the other computing device.

Figure 11:
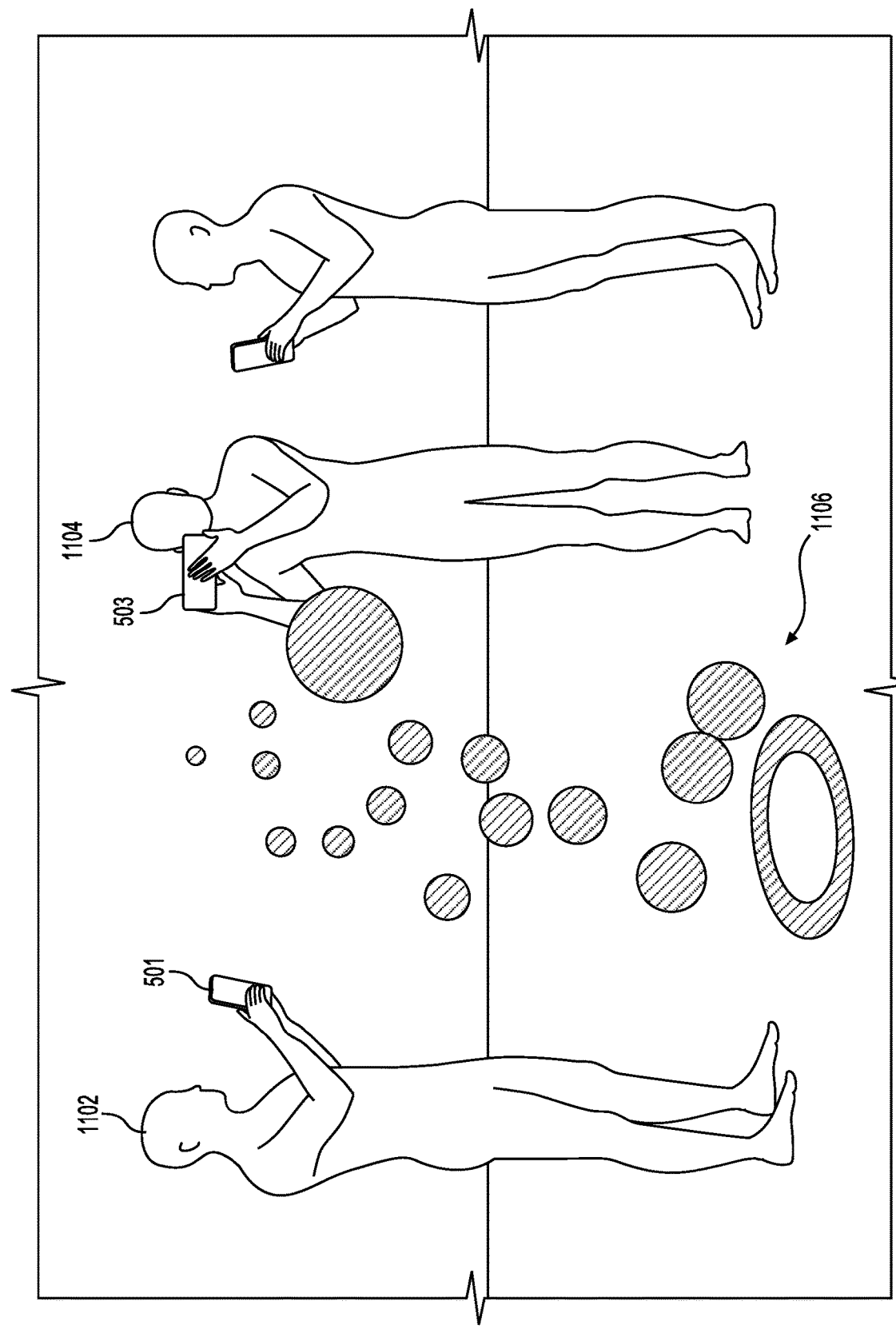
FIG. 11 illustrates a multi-user AR experience, in accordance with certain aspects of the present disclosure.

FIG. 11 illustrates a multi-user AR experience, in accordance with certain aspects of the present disclosure. As shown, multiple users may take part in an AR gaming experience. In the example shown in FIG. 11, the AR experience involves bubbles which could be popped by one or more users. For example, if user 1102 pops one of the bubbles 1106 in the augmented space via computing device 501, data coordinating such a change may be communicated to the computing device 503 such that user 1104 also sees the same bubble pop in AR. While the bubbles 1106 are shown in the environment around the users to facilitate understanding with respect to AR, it should be noted that the bubbles are displayed on a screen of computing device overlayed on an image (or video) captured by the camera of the computing device.

The aspects described here facilitate one or more interactive experiences to be triggered via a single end-user reaching a geo-triggered game POI represented by a geo decimal latitude and longitude sequence. The physical ground is detected via planar scanning and becomes the core reference point for the augmented experience. This data is then shared across multi-collected clients to form an AR peer-to-peer network AR experience. One or more interactive experiences may be joined via a single end-user reaching a geo-triggered state, resulting in in a client host relationship where one to many users can join in an AR experience at that same location triggered at the geo access point.

Figure 12:
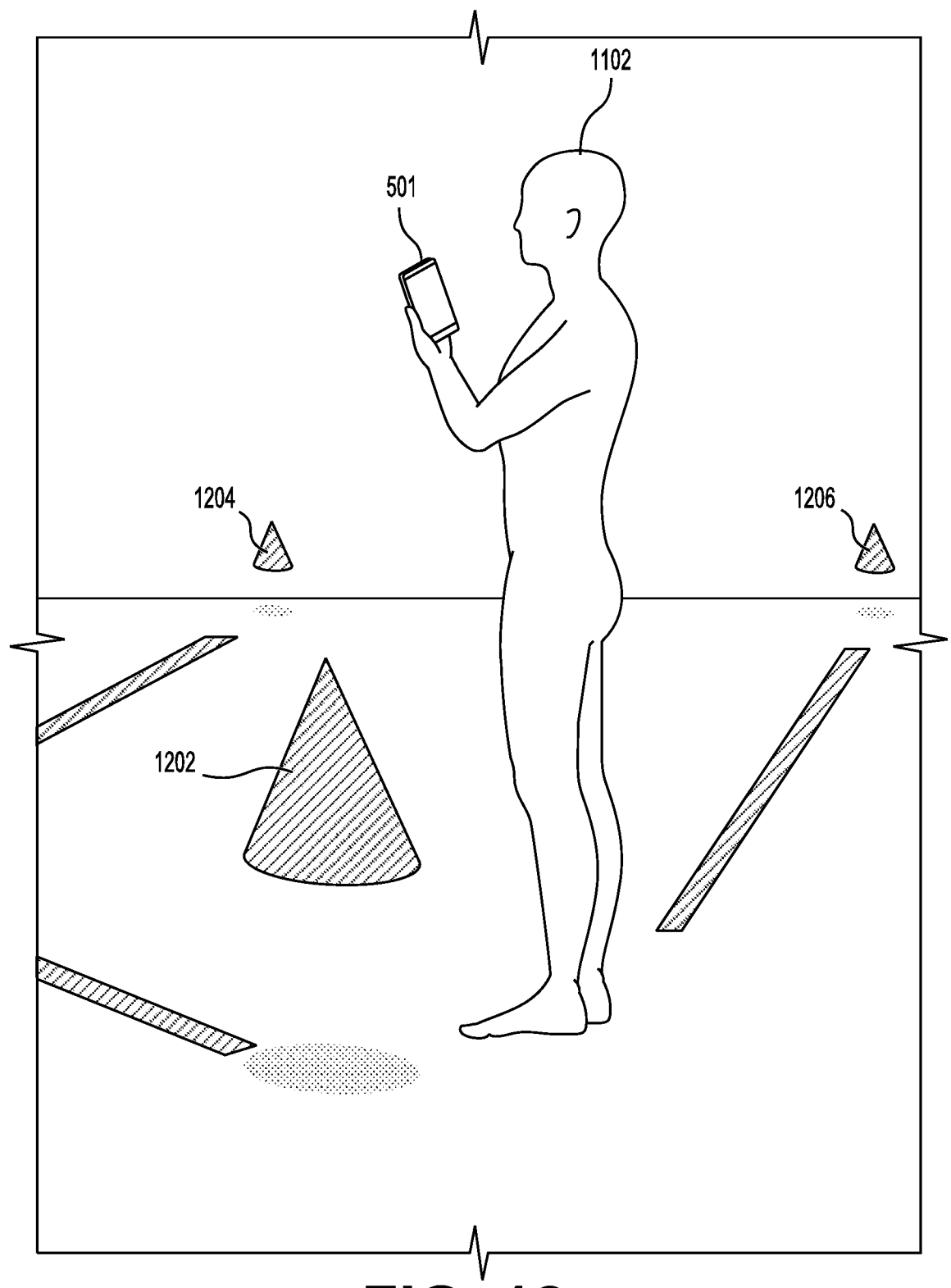
FIG. 12 illustrates a scanned plane in an environment with spatial markers, in accordance with certain aspects of the present disclosure.

FIG. 12 illustrates a scanned plane in an environment with spatial markers, in accordance with certain aspects of the present disclosure. As shown, the user 1102 may scan a plane using a camera of the computing device 501. Spatial markers 1202, 1204, 1206 may be placed to define a boundary of the scanned plane, as shown.

Figure 13:
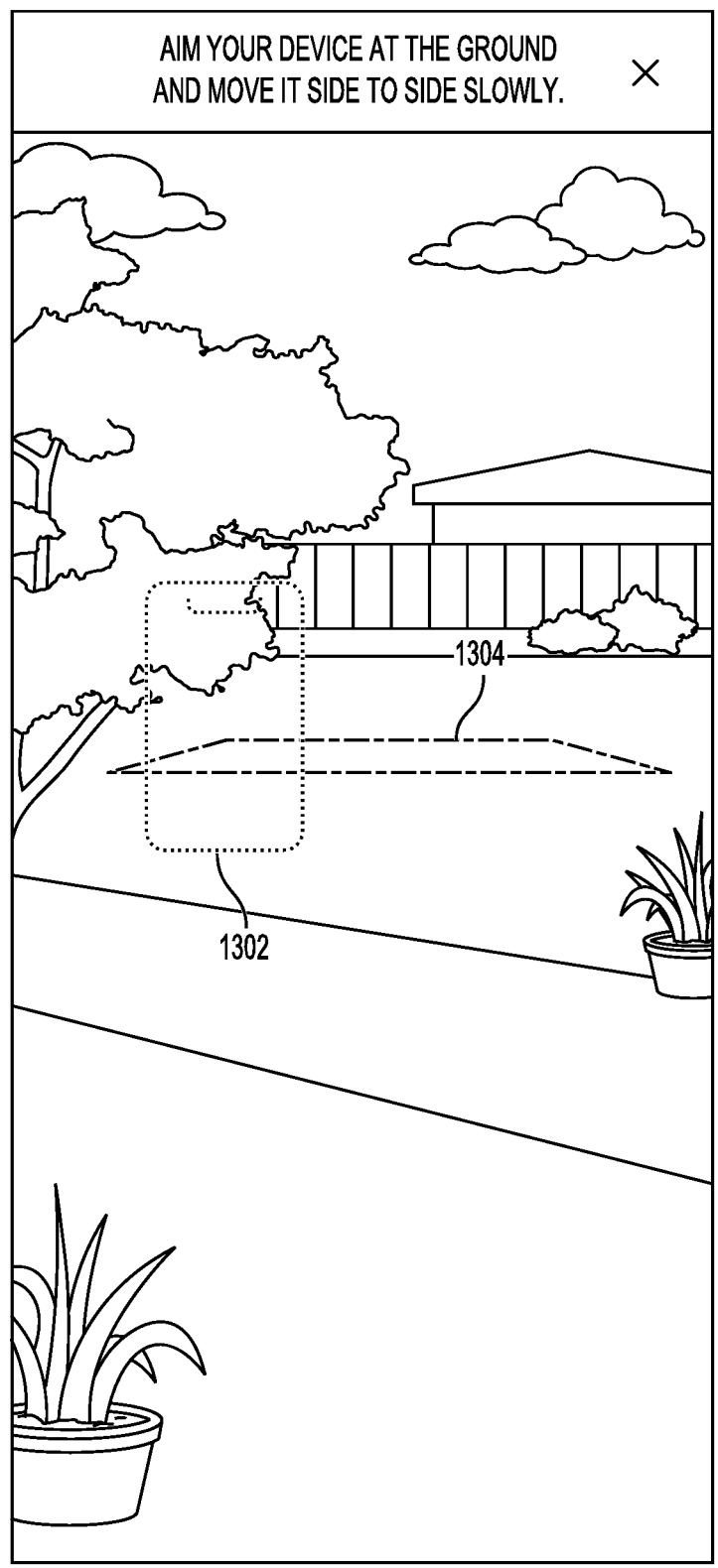
FIG. 13 illustrates example techniques for scanning a plane, in accordance with certain aspects of the present disclosure.

FIG. 13 illustrates example techniques for scanning a plane, in accordance with certain aspects of the present disclosure. As shown, once a user is at location mapped to an AR experience or scans a marker for an AR experience, the computing device (e.g., represented by outline 1302) of the user may instruct the user to aim the computing device to at the ground and move the device from side to side, allowing the computing device to scan on a plane 1304 on the ground. The plane 1304 is then used by the computing device to generate an AR experience (e.g., object) overlayed on the image or video captured by the camera of the computing device.

Figure 14:
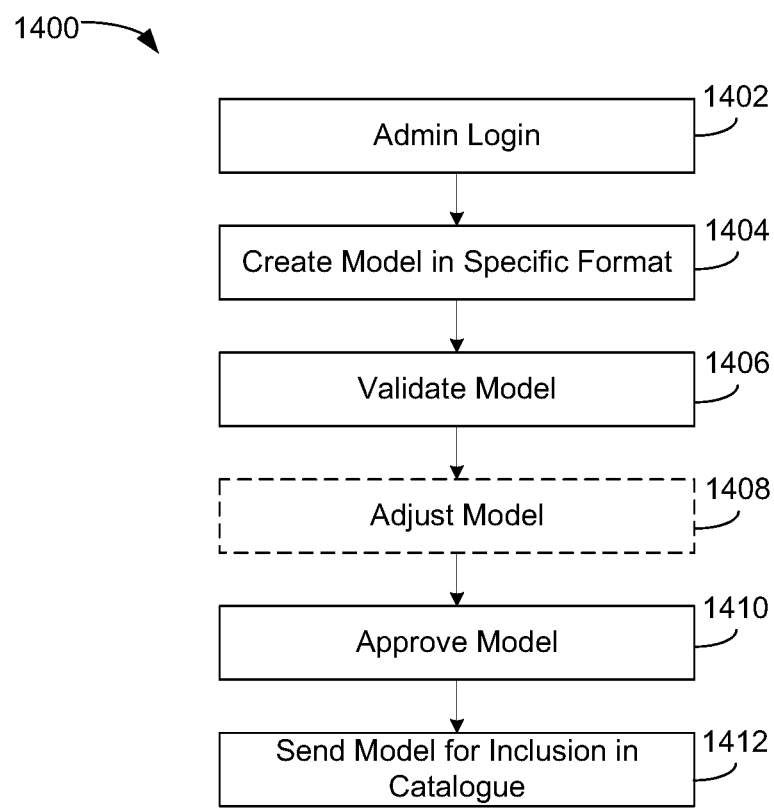
FIG. 14 is a flow diagram illustrating example operations for AR creation and validation, in accordance with certain aspects of the present disclosure.

FIG. 14 is a flow diagram illustrating example operations 1400 for AR creation and validation, in accordance with certain aspects of the present disclosure. The operations 1400 may be performed, for example, by a computing device, such as the computing device 100.

At block 1402, the computing device may receive an administrator login. At block 1404, the computing device may receive an indication of a model in a specific format. The model may be for creation of an AR experience. At block 1406, the computing device may validate the model to determine whether the model meets various criteria to be used as an AR experience. For example, referring back to FIG. 1, the computing device 100 may include a validation component 136 that validate a model as an AR experience. In some cases, at block 1408, the computing device may adjust the model to meet the criteria, if possible. If not, the computing device may indicate to the user that the model does not meet one or more criteria, and in some aspects, provide an indication of what criteria the model does not meet and how to correct the model. At block 1410, the computing device may approve the model, and at block 1412, send the model to a server via a network for inclusion in a catalogue. Once included in the catalogue, the model may be accessible by users as an asset. A revenue sharing structure may be implemented for usage of the AR experience.

Figure 15:
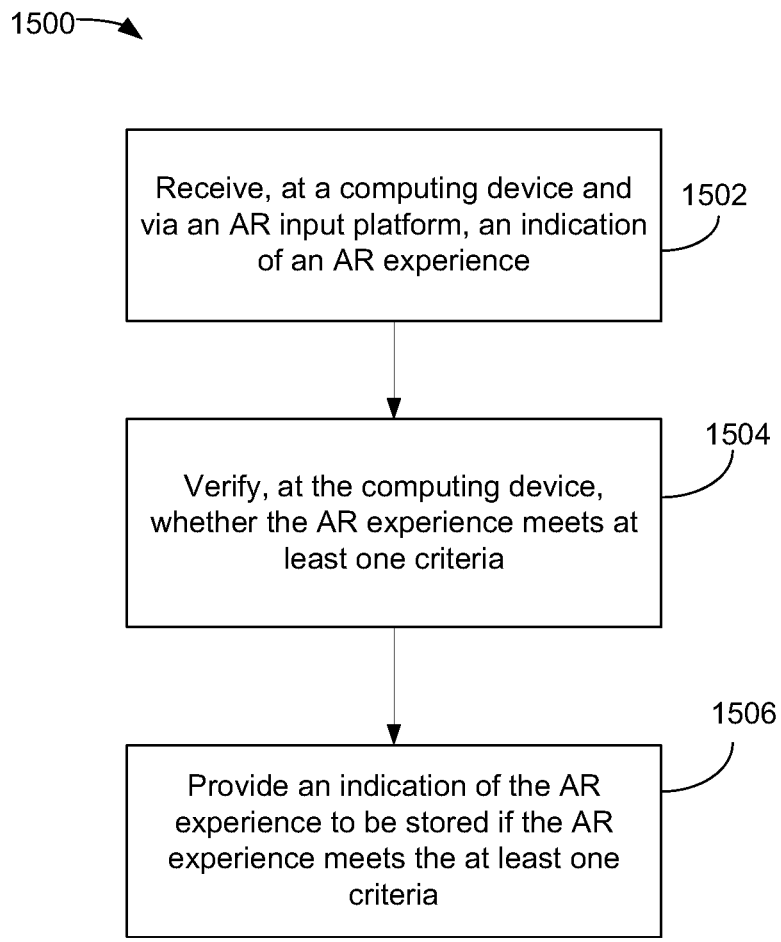
FIG. 15 is a flow diagram illustrating example operations for AR processing, in accordance with certain aspects of the present disclosure.

FIG. 15 is a flow diagram illustrating example operations 1500 for AR creation and validation, in accordance with certain aspects of the present disclosure. The operations 1500 may be performed, for example, by a computing device, such as the computing device 100.

At block 1502, the computing device may receive, via an AR input platform, an indication of an AR experience. At block 1504, the computing device verifies whether the AR experience meets at least one criteria. In some aspects, the computing device may notify the user that the AR experience failed verification in response to the AR experience failing to meet the at least one criteria. At block 1506, the computing device provides an indication of the AR experience to be stored if the AR experience meets the at least one criteria.

Certain aspects provide techniques for deploying an AR bundle to an administrator without re-deployment of an application. A quick sales demo to a geo-triggered location may be provided, the demo being invoked in the core application by entering a code. This code then triggers the content download from an administrator portal, which allows the user to experience one to many AR experiences at any geo decimal location in the world. In other words, the administrative user platform 400 may allow an administrator to download AR experience bundles and demo any selected one of the AR experiences at any location of the administrators choosing. The administrator may then select an AR experience to be included as part of a guided tour, as described herein.

Referring to FIG. 1, storage 108 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage 108 can include software services, servers, services, etc., that when the code that defines such software is executed by the processor 110, it causes the system to perform a function. In some aspects, a hardware service that performs a particular function can include the software component stored in a computer-readable medium in connection with the necessary hardware components, such as processor 110 to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for augmented reality (AR) processing, comprising:
   receiving, at a computing device, an indication of a sensor input trigger via an administrative user platform;
   receiving, at the computing device and via the administrative user platform, a mapping of the sensor input trigger to an AR experience to be displayed at one or more user devices upon detection of the sensor input trigger; and
   sending, to another computing device, an indication of the sensor input trigger and the mapping of the sensor input trigger to the AR experience.

2. The method of claim 1, further comprising receiving an indication of a coupon to be displayed to a user upon the AR experience being displayed.

3. The method of claim 1, wherein the sensor input trigger comprises a user device being within proximity to a real-world location.

4. The method of claim 1, wherein detecting the sensor input trigger comprises scanning a marker.

5. The method of claim 1, wherein receiving the sensor input trigger and the mapping includes receiving an indication of the sensor input trigger and the AR experience in accordance with preset fields associated with the administrative user platform.

6. The method of claim 1, wherein receiving the mapping includes receiving an indication one of multiple candidate AR experiences configured for selection.

7. The method of claim 1, further comprising receiving an indication of tour points to be presented to a user, wherein the AR experience is to be triggered at one of the tour points.

8. A method of augmented reality (AR) processing by a user device, comprising:
   detecting a sensor input trigger via at least one sensor of the user device;
   selecting an AR experience mapped to the sensor input trigger;
   displaying the AR experience to a user of the user device in response to the sensor input trigger being detected; and
   providing a marker to be scanned by another user device to coordinate the AR experience between the user device and another user device.

9. The method of claim 8, further comprising communicating data between the user device and the other user device to coordinate the AR experience in response to the marker being scanned.

10. The method of claim 9, wherein the data is communicated using a peer to peer connection between the user device and the other user device.

11. The method of claim 8, wherein the AR experience being coordinated between the user device and the other user device comprises the AR experience being synchronized when displayed at the user device and the other user device.

12. The method of claim 8, wherein detecting the sensor input trigger comprises detecting that the user is within proximity to a real-world location.

13. The method of claim 8, wherein detecting the sensor input trigger comprises scanning a marker.

14. The method of claim 8, further comprising displaying a coupon to the user in response to the AR experience being displayed.

15. The method of claim 8, further comprising:
   detecting that the user device is within proximity to a location associated with the AR experience; and
   in response to detecting that the user is within proximity to the location, sending a notification to the user to switch to a navigation feature that directs the user to the location associated with the AR experience.

16. The method of claim 15, wherein the navigation feature includes driving directions to the location associated with the AR experience.

17. The method of claim 8, further comprising displaying, to a user of the user device, tour points on a map, wherein detecting the sensor input trigger comprises detecting that the user device is in proximity to one of the tour points.

18. A method of augmented reality (AR) processing by a user device, comprising:

scanning a marker provided by another user device via at least one sensor of the user device;
selecting an AR experience based on the marker;
displaying the AR experience to a user of the user device in response to scanning the marker; and
receiving data coordinating the AR experience between the user device and the other user device.

19. The method of claim 18, further comprising displaying a coupon to a user of the user device in response to the AR experience being displayed.

20. The method of claim 18, wherein the data is received using a peer to peer connection between the user device and the other user device.

\* \* \* \* \*